US007225633B2

(12) United States Patent
DeMars (10) Patent No.: US 7,225,633 B2
(45) Date of Patent: Jun. 5, 2007

(54) ROTARY FOOD SERVER

(75) Inventor: Robert A. DeMars, Woodland Hills, CA (US)

(73) Assignee: Original Ideas Inc., Calabasas, CA (US)

( * ) Notice: Subject to any disclaimer, the term of this patent is extended or adjusted under 35 U.S.C. 154(b) by 93 days.

(21) Appl. No.: 10/617,004

(22) Filed: Jul. 9, 2003

(65) Prior Publication Data

US 2005/0005631 A1  Jan. 13, 2005

(51) Int. Cl.
*F25B 3/08* (2006.01)
(52) U.S. Cl. .................. 62/457.6; 62/457.2; 62/371
(58) Field of Classification Search ........... 62/457.2, 62/457.6, 371, 530
See application file for complete search history.

(56) References Cited

U.S. PATENT DOCUMENTS

| 1,277,253 | A | 8/1918 | Paschal |
| D65,722 | S | 10/1924 | Bennett |
| 1,768,976 | A | 7/1930 | Cuthbertson |
| D91,971 | S | 4/1934 | Scurlock |
| D92,981 | S | 8/1934 | Scurlock |
| 2,030,899 | A | 2/1936 | Scurlock |
| 2,042,637 | A | 6/1936 | Scurlock |
| 2,052,801 | A | 9/1936 | Russakov |
| 2,110,921 | A | 3/1938 | Scurlock |
| D160,688 | S | 10/1950 | Brock |
| 2,553,880 | A | 5/1951 | Stigler |
| 2,625,274 | A | 1/1953 | Clements |
| D169,143 | S | 3/1953 | Karoff |
| D170,917 | S | 11/1953 | Gruen |
| D173,456 | S | 11/1954 | Rosen |
| 2,719,413 | A | 10/1955 | Panzer |
| D176,097 | S | 11/1955 | Bonistall |
| D178,029 | S | 6/1956 | Warren |
| D178,473 | S | 8/1956 | Warren |
| D181,776 | S | 12/1957 | Asquith |
| D182,697 | S | 4/1958 | Warren |
| D183,285 | S | 7/1958 | Lipka |
| 2,880,882 | A | 4/1959 | Lipka |
| 2,978,285 | A | 4/1961 | Jester |
| D193,103 | S | 6/1962 | Heller |
| D193,308 | S | 7/1962 | Jackson |
| D207,409 | S | 4/1967 | Laughlin |
| 3,331,515 | A | 7/1967 | Lange |
| D209,848 | S | 1/1968 | Berend |
| D210,311 | S | 2/1968 | Newman |
| 3,385,465 | A | 5/1968 | Bliss |
| 3,413,820 | A | 12/1968 | Paquin |
| 3,972,419 | A | 8/1976 | Short |

(Continued)

*Primary Examiner*—Melvin Jones
(74) *Attorney, Agent, or Firm*—Hogan & Hartson, L.L.P.

(57) ABSTRACT

A rotary food server for storing food in a chilled condition includes a dish rotatably mounted on a stationary base and having central and peripheral pockets for removably receiving food storage trays having removable lids. Coolant housings containing a chilled-retaining substance are refrigerator prior to use and then placed beneath and at the sides of the trays to chill food stored in the trays. In an alternative embodiment, a lower housing rotatably mounted on a stationary base has a cavity therein filled with a cooling medium such as a mixture of ice and water. Mounting of an upper housing on the lower housing causes cavities formed in the upper housing to displace the cooling medium to the sides as well as the bottoms thereof to chill food stored within the cavities.

22 Claims, 7 Drawing Sheets

U.S. PATENT DOCUMENTS

| | | |
|---|---|---|
| D260,219 S | 8/1981 | Blake et al. |
| D260,343 S | 8/1981 | Blake et al. |
| D260,469 S | 9/1981 | Blake et al. |
| D285,157 S | 8/1986 | Wan |
| D285,638 S | 9/1986 | Trivison |
| D286,124 S | 10/1986 | Dempsey |
| D286,360 S | 10/1986 | Trivison |
| 4,775,055 A | 10/1988 | Morse |
| D310,940 S | 10/1990 | Kastanek |
| 4,989,419 A | 2/1991 | Brando et al. |
| 5,088,301 A | 2/1992 | Piepenbrink |
| 5,544,489 A | 8/1996 | Moren |
| D407,610 S | 4/1999 | Weterrings et al. |
| D408,212 S | 4/1999 | Blaise |
| 6,131,393 A | 10/2000 | Greene |
| 6,182,839 B1 | 2/2001 | Robbins et al. |
| 6,237,345 B1 | 5/2001 | Kalman et al. |
| 6,477,855 B1 | 11/2002 | Findley et al. |
| 6,557,368 B1 * | 5/2003 | DeMars .................... 62/457.2 |

* cited by examiner

ROTARY FOOD SERVER

CROSS-REFERENCES TO RELATED APPLICATIONS

There are no related applications.

STATEMENT REGARDING FEDERALLY SPONSORED RESEARCH AND DEVELOPMENT

Not applicable.

REFERENCE TO A "MICROFICHE APPENDIX"

Not applicable.

BACKGROUND OF THE INVENTION (1) Field of the Invention

This invention relates to a rotary food server and, in particular, to such a device capable of storing food in a chilled condition.

(2) History of the Prior Art

In outdoor home cooking, for example, such as is associated with barbeque prepared food, it is common to accompany the food with salad items such as lettuce, sliced tomato, and condiments which diners serve to themselves, often from a series of salad bowls and similar receptacles. The storage and service of the accompanying foods in open bottles is the source of many all too familiar problems. Health concerns are important in hot weather if the accompanying ingredients are left out at ambient temperature because bacteria can multiply to population levels which pose risks of stomach upset and worse if left too long in the heat. The taste and appearance of foods such as lettuce and potato salad can deteriorate at an outdoor picnic or barbeque if these foods are simply left out in bowls for people to help themselves from. Also, if uncovered bowls are used, it may not be long before food becomes contaminated by unwanted falling of materials into the uncovered bowls or by unwanted insects such as ants and wasps. Also, there can be lack of convenience at the meal table if the accompanying foods are served in too many bowls which require excessive passing back and forth and clutter the dining table area unacceptably.

One approach to improving outdoor food service has been to use rotary food containers, of the lazy susan type, for the fixings that often accompany outdoor dining such as lettuce, tomato, potato salad, condiments and so forth. To keep out contaminants and unwanted insects, a lazy susan may also be combined with containers for these types of food which have removable lids on them. One example of a lazy susan type food server was shown in U.S. Pat. No. Des. 260,469. While this type of structure may provide some improvements over using an uncovered salad bowl, in terms of convenience and hygiene, the problems associated with failing to keep the food adequately chilled are not ameliorated in its approach.

The advantage, however, of keeping the salad type foods in a chilled condition have been recognized and have led to proposals for use of a chill retaining gel material incorporated into the structure of an outdoor serving tray or dish. One such prior product is a chill retention food service tray disclosed in U.S. Pat. No. 4,989,419. The '419 patent discloses a service tray which is generally circular and has a rim and a central boss and a number of spokes extending radially in the form of walls which divide the tray into a number of peripherally spaced regions in which differing foods can be placed and served. The '419 patent disclosed using regions of at least the base wall and some upstanding vertical walls of a food service tray for gel material which can be refrigerated before food is served from the pocket regions of the tray. While there is no reason to question the operability of the device of the '419 patent, it does not provide a lazy susan type serving approach under which the foods necessary can be contained within a single convenient server. It seems, so far as the present inventor is aware, that previous efforts to devise a practical rotary server that can keep food such as lettuce, sliced tomato and potato salad chilled in an outdoor dining situation, cover against insects and other pollution, and easily selectable by a diner, have gone largely unsatisfied, notwithstanding the large number of prior patents that can be found showing earlier proposals for lazy susan types of items.

SUMMARY OF THE INVENTION

The present invention provides a rotary food server for storing food in a chilled condition and serving it to a user.

A food server, in accordance with the present invention, includes a horizontal base on which is a dish mounted for rotation about a vertical axis. The dish has a central boss and an outer rim and is divided by a number of dividing walls into a series of generally pie-shaped pockets, each of which can receive a correspondingly-shaped, pie-shaped food tray. Each food tray has a movable and detachable lid. The separate trays provide for storage of a different food within each tray on the dish, for example, lettuce in one, tomatoes in another and so on.

The walls of each tray can each include a hollow region containing chill retention gel material so that the food within that tray is kept in a cool condition as long as the gel remains chilled.

Thus, food within each tray is stored in a chilled condition. Food within any selected tray may be served by rotating the dish to move the selected tray into proximity where the desirous user raises the lid to extract the contents.

A further significant aspect of the invention is that the lids are detachable and the trays are differently sized to enable them to be stacked together in nested relation, after the lids have been removed. The masted trays can be placed together in the freezer section of the refrigerator to chill the retention material in advance of use of the device.

In a further aspect, the rotary server has a central boss with a well within it to receive a cup for holding condiments. Coolant housings which surround the cup are refrigerated, along with the trays, before the food server is to be used. After the cup has been filled with food, such as condiments, the coldness of the chill retention material in the coolant housings keeps the condiments chilled. The coolant housings also assist in chilling the trays at their inner ends where they close to the housings.

In an alternative embodiment of a food server according to the invention, a one-piece dish is mounted on a horizontal base for rotation about a vertical axis. The dish has an outer rim and forms a lower housing. A one-piece upper housing has a plurality of cavities therein which define food trays. Each of the food trays is covered by a hinged lid which is detachable. One of the food trays is formed by a cup shaped cavity at the center of the circular upper housing. The remaining cavities, which are generally pie-shaped extend around the upper housing outside of the cup shaped cavity and form pie-shaped food trays.

The cup shaped food tray and the pie-shaped food trays are maintained in a chilled condition by first filling the lower housing with a mixture of water and ice to a desired level. When the upper housing is then mounted in the lower housing, the mixture of water and ice is displaced and rises along the sides of the food tray forming cavities to chill the cavities and thereby food which is stored therein.

This summary is not intended to be exhaustive of all features of the invention which is fully set forth in the following detailed description encountered by the claims.

DETAILED DESCRIPTION

Figure 1:
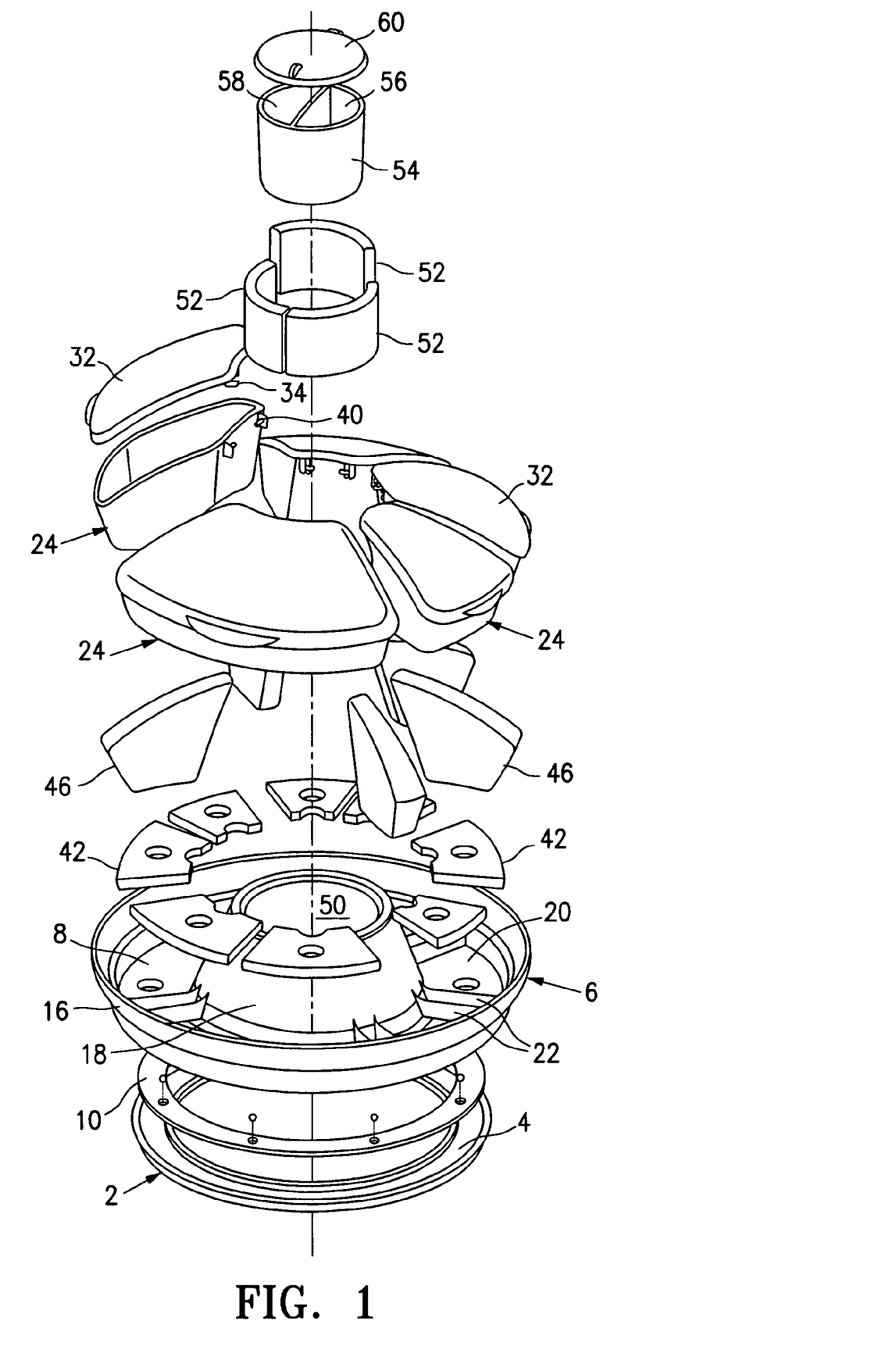
FIG. 1 is an exploded perspective view showing a rotary server for food, according to one embodiment of the invention.
Figure 2:
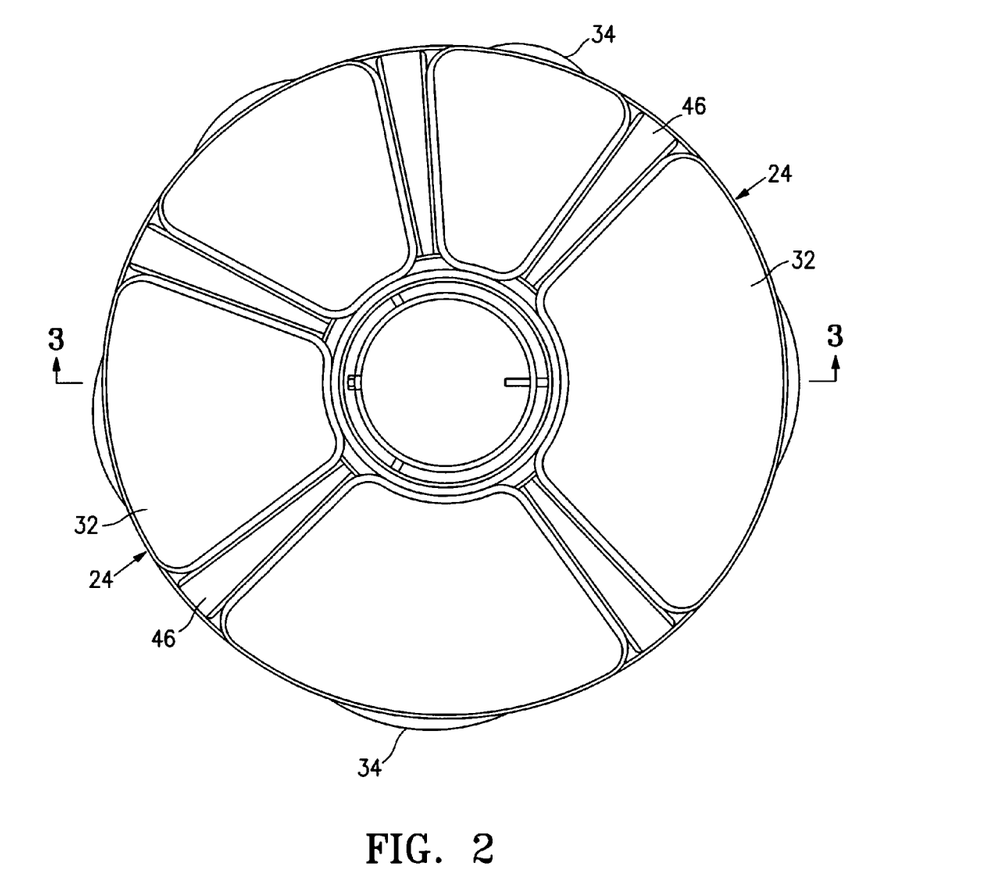
FIG. 2 is a plan view, looking down from the top, of the rotary food server shown in FIG. 1.

A rotary food server, according to one embodiment of the invention, is illustrated in FIG. 1 with the part shown in an exploded condition. The rotary server is intended to serve food, which may typically be the type of food associated with outdoor barbecue meals, such as lettuce, sliced tomato, sliced cucumber, pickles and condiments. The server can also be used for indoor types of food, such as popcorn, chips, nachos. These examples are not meant to be limiting but merely exemplary and the term "food" is to be given its broadest ordinary meaning. The food server, as will be described, can be partially disassembled between uses to separate out certain parts that contain a chill retention material such as, for example, the material popularly known as Blue Ice. These parts, which include trays for the food, can be stored in the freezer section of the household refrigerator. When the time comes for use, the parts are rinsed and the trays are filled with the desired foods so that the chill retention material can maintain them in a chilled condition for lengthy periods of time and use of the food server at a picnic or barbecue.

Considering the exploded parts in more detail, the food server includes and rests upon a stationary base 2. The base is ring-shaped and has a U-shaped channel 4 extending peripherally in its upper surface. The base supports a dish 6, also generally circular, for rotation about a central vertical axis shown by the central dotted line in FIG. 1. The dish 6 has a bottom wall 8 that has a bowl race 10 fixedly secured to its underside. The race 10 rests within the channel 4 in the base and has a plurality of caged ball bearings 14 (FIG. 3) which support the dish for rotation on the base about the central vertical axis.

The dish 6 has a peripheral circular rim 16 extending upwardly and outwardly from the bottom wall 8. As shown in FIG. 1, the rim 16 has a lower portion of relatively smaller radius than the upper region, with the two connected by an intermediate horizontal region. In the center of the dish 6, a boss 18 resembling a truncated cone, extends outwardly and inwardly from the base wall 8. The peripheral wall surface of the boss 18 and the facing peripheral wall surface of the rim 16 define an annular channel within the dish 6, which is divided into a series of peripherally extending pockets 20 by a series of dividing walls 22. The dividing walls 22 extend between the lower region of the rim 16 and a lower reach of the boss 18, extending radially in closely spaced paths.

The reason for the pockets 20 is to receive and seat a plurality of food containing trays 24 (FIGS. 1–4). The trays 24 are differently sized to be able to accommodate foods picking up different volumes and acquiring different quantities. For example, one of the largest of the trays 24 may be used for storing the lettuce which, because of its leafy quality and the relatively large volume that it takes up, requires a relatively large allotment of the total storage space available. Another relatively large one of the trays 24 may be used for potato salad. Conversely, the smaller ones of the trays may be chosen for foods which are eaten in more sparing quantities and have a higher density, such as chopped onion. What particular foods are placed in particular trays will, of course, be a matter of individual choice depending on the nature of the foods chosen for a particular meal by a user. Because the trays 24 are differently sized, the various pockets 20 will be differently sized correspondingly. To facilitate ease of placement of the trays 24 within the pockets 20, each pocket can be marked, on the base wall or on the bar, with a particular letter or number, and the tray can be correspondingly marked with the same identifying letter or number. The outward sloping of the rim 16 and the inward sloping of the boss 18 facilitate ease of placement of the trays 24 within the pockets 20.

Figure 3:
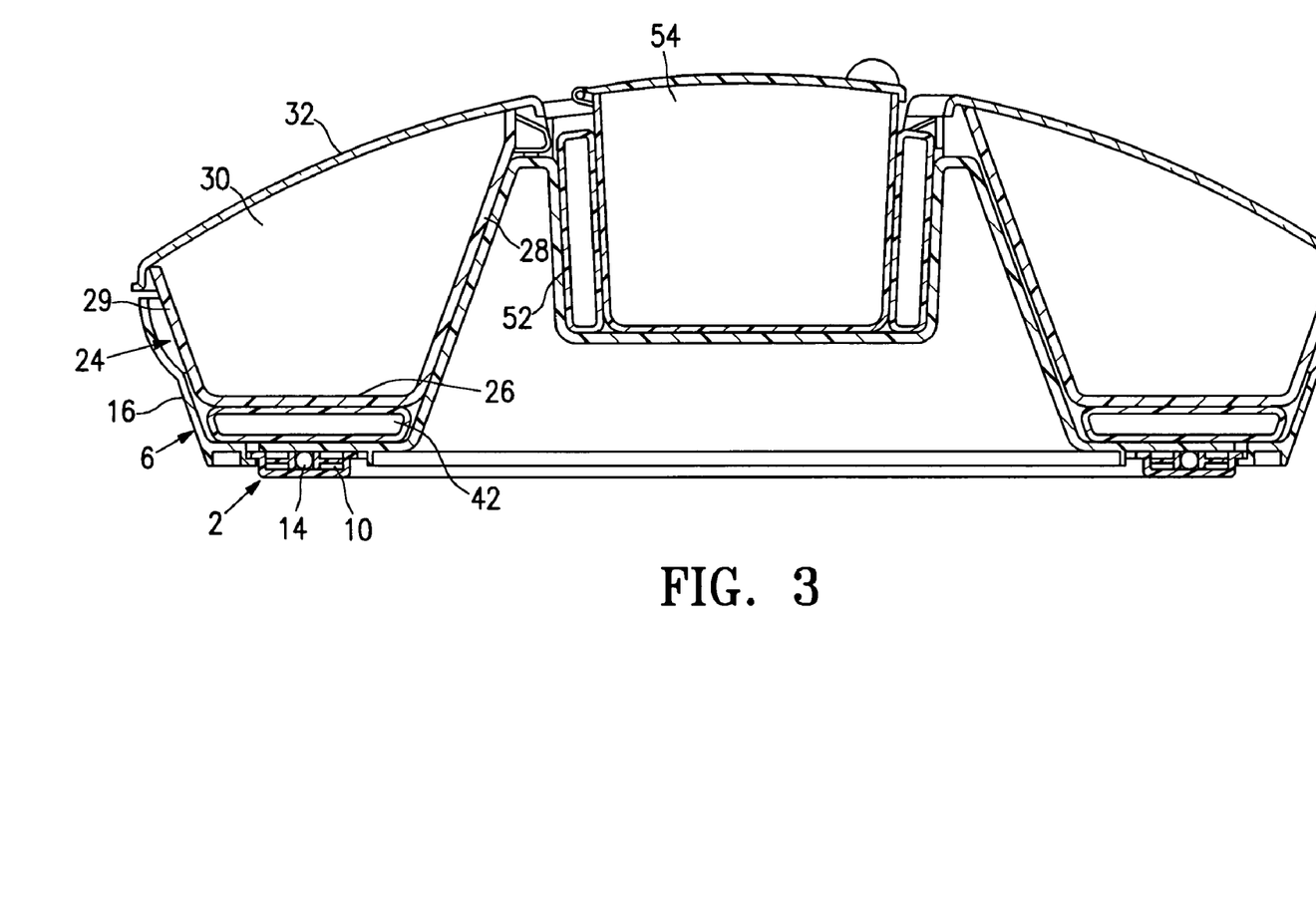
FIG. 3 is a side view in cross-section of the server shown in FIG. 2 taken along the lines of 3—3 therein.
Figure 4:
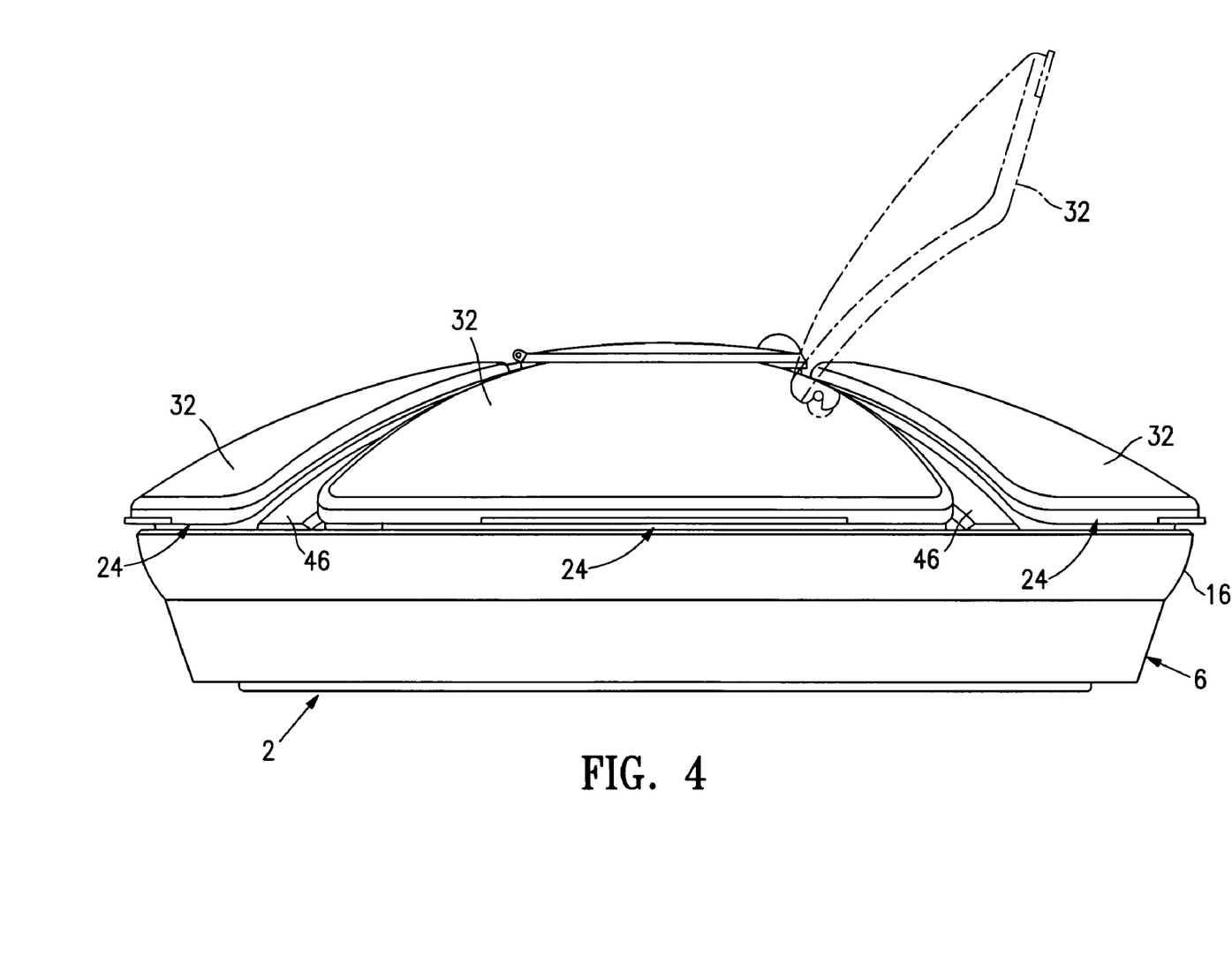
FIG. 4 is a side elevation of the food server shown in FIG. 2 in which a lid of one of several trays forming a part of the invention shown in FIG. 1 is shown in dotted line in an open position.

Each tray 24, as shown in FIG. 3, has a bottom wall 26, inner and outer end walls 28 and 29 shaped to abut and extend along the rim and sidewalls 30 which, in their lower regions, abut the end walls 22 defining the particular pocket 20 in which the tray is placed. In the preferred embodiment, the trays are made of a suitable moldable plastic of the type typically used for food containers, such as molded polyethylene or molded polypropylene. The corners where the various walls meet are rounded into each other to provide radiused edges.

To close each tray 24 at its open upper end, a complementary shaped lid 32 is hinged to the upper end of the inner wall 28 of the tray. The lid 32, in the lowered condition shown in FIG. 3, helps to keep the interior of the tray cool and keeps out dirt, pollutants, insects and other undesirables. In the preferred embodiment, the lid 32 is made of a transparent rigid plastic having good scratch resistance and resistant to breakability, such as polycarbonate plastic. In its central outer region, the lid 32 is provided with a protruding finger lip to assist the user in raising the lid.

Figure 5:
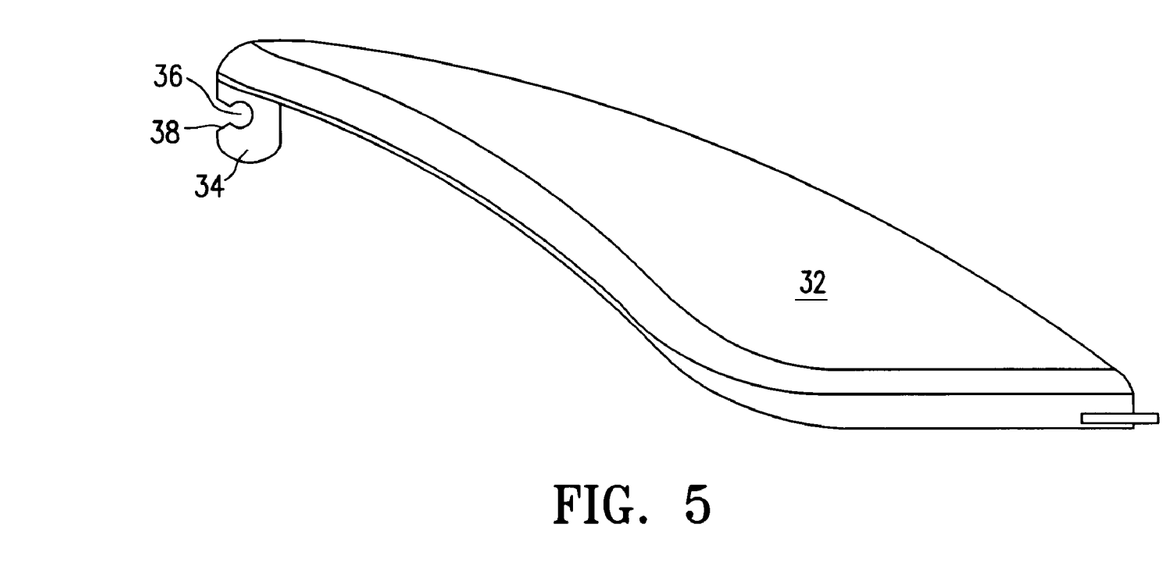
FIG. 5 is an enlarged perspective view of one of the tray lids showing the socket part of a snap fit detachable hinge by which the lid is attached to the tray.

Referring to the illustration of half of one of the lids 32 provided in FIG. 5, each lid is provided with two split sockets 34 projecting from the underside of the lid adjacent its inner extremity. Each socket 34 has a central opening 36 and a notch 38 facing rearwardly and extending for a minor segment of the opening 36. The opening 36 is sized to rotatably fit around one of two axles 40 which project in aligned space relationship from the rear of the inner wall 28 of the tray adjacent its upper end by conventional supporting structure. The socket 34 permits the lid to be raised from the lowered position shown in FIG. 3 to a raised position shown in FIG. 4 and returned, by finger pressure applied to the finger lip. Each socket 34 is initially snap pivoted onto its associated axle 40 by forcing the notch against the axle 40 until the plastic is resiliently forced apart sufficiently for the axle 40 to enter the opening 36. This snap-fit relationship is reversed by a manual pressure applied to the lid 32 to detach the lid 32 from the tray 24 when desired.

An important aspect of the invention resides in features intended to provide a chilled environment for storage of the foods within the trays 24. One of these features resides in coolant housings 42 (FIGS. 1 and 3), which are shaped to fit within the pockets 20 beneath the trays 24, in the form of thin hollow segment-shaped containers. These containers are filled through openings in the top of the container which are subsequently sealed, with a chill-retaining substance. This substance, in the preferred embodiment, is a gel of the type used in medical ice packs for cold therapy under the name Blue Ice and other trademarks. Another material for the chill retention substance may, for example, be the gel disclosed in U.S. Pat. No. 4,989,419. The desirable properties of the gel are that it has a high thermal capacity, it retains its cooled condition for at least a few hours, enough to have a picnic, and that it may be repeatedly refrigerated and allowed to rise to a cool temperature without deteriorating. Moreover, its coefficient of expansion is sufficiently limited that it will not rupture the walls of the container 42 within which it is confined, during repeated cycles of refrigeration and use. As visible in FIG. 3, the chill-retaining substance is in the interior of coolant housing 42 in close proximity to the bottom wall 26 of the associated tray 24 for thermal transfer between the food and the interior of the tray and the chill-retaining substance.

Another feature of the chill-retaining capability of the invention resides in thermal transfer through the sidewalls 30 of each tray. For this purpose, each of the pairs of walls 22 receives a vertical dividing wall 46, shown in FIG. 1, which is also an enclosed container for the chill-containing substance. Each of these dividing walls 46, at its lower end, is received between the adjacent walls 22 and extends upwardly to the full extent of the interior of the associated trays 24 on either side of it.

To chill the trays 24 and the coolant housings 42, the trays 24 are lifted out of the dish. Then the user removes the coolant housings 42 and the vertical walls 46, all of which contain the chill-retaining substance, and place them in the freezer section of a refrigerator so that they may be chilled to freezing temperature. When the time comes for use of the rotary server, the coolant housings 42 or the walls 46 are taken from the refrigerator and reinstalled in the dish, together with the trays 24. In this condition, the trays are now ready to receive food where it will be maintained in a chilled condition for a prolonged time because of thermal transfer through the base wall and the sidewalls of each tray 24 to the chill-retaining substance.

Alternatively, the chill-retention substance can be housed directly within hollow regions in the sidewalls and bottom walls of the tray 24 itself. In such arrangement, the tray is conducted as an inner tray and a complemental outer tray, joined together along their peripheral edges, defining an interior space between them. The chill-retaining substance is placed, during manufacture, in this interior space between the inner and outer sidewalls in each tray rather than in separate enclosures as described above.

Although the chill-retaining substance, has been described as comprising a gel, such substance can instead comprise a mixture of ice and water.

A further aspect of the invention resides in a separate chilled compartment for condiments. Referring to FIGS. 1 and 3, the previously mentioned boss 18 includes a central well 50 extending downwardly and centrally in the center of the bar. The well 50 is defined by a molded sidewall region formed as a cylinder having a closed lower end and an open upper end which blends integrally into the sidewall defining the remainder of the boss 18. The well 50 receives free curved hollow segmental coolant housings which surround a removable cup 54. The coolant housings 52 also contain the chill-containing substance and also chilled for use in the refrigerator as described for the other chilled sections. The cup 54 is divided by an interior wall into two chambers 56 and 58. For example, the user may choose to put tomato catsup in one and mustard in the other. The cup 54 has its own lid 60 to assist in retaining the contents in a chilled condition and keep out pollutants and insects.

Another aspect of the invention resides in making the trays nestable once the lids have been detached. Accordingly, they are sized and shaped to stack together in a nested relation so that the trays may be placed together in the freezer.

Another aspect of the invention resides in structure which allows the lids 32 of adjacent trays 24 to be raised without interference with each other. It will be appreciated that, with the lids 32 in the closed condition, they are below a horizontal condition in which the peripheral edges of adjacent lids 32 are closest together. To avoid a condition in which the simultaneous raising of the lids 32 of two adjacent trays 24 could cause the lids 32 to interfere as they reach the horizontal condition of the plane, the dividing walls 46 are made sufficiently wide in the peripheral direction that they ensure sufficient spacing between the lids 32 of the adjacent trays 24 to avoid interference between adjacent lids 32 as they are raised through the horizontal plane.

The rotary food server shown in FIGS. 1–5 provides various advantages over conventional food servers as described. However, it would be advantageous to provide an alternative embodiment having other features which may be attractive. For one thing, it may be desirable for some applications to avoid having to refrigerate a substantial number of coolant housings prior to use of the food server. Also, it may be desirable for certain applications to have a food server of relatively simple design and having only a few parts to contend with.

Figure 6:
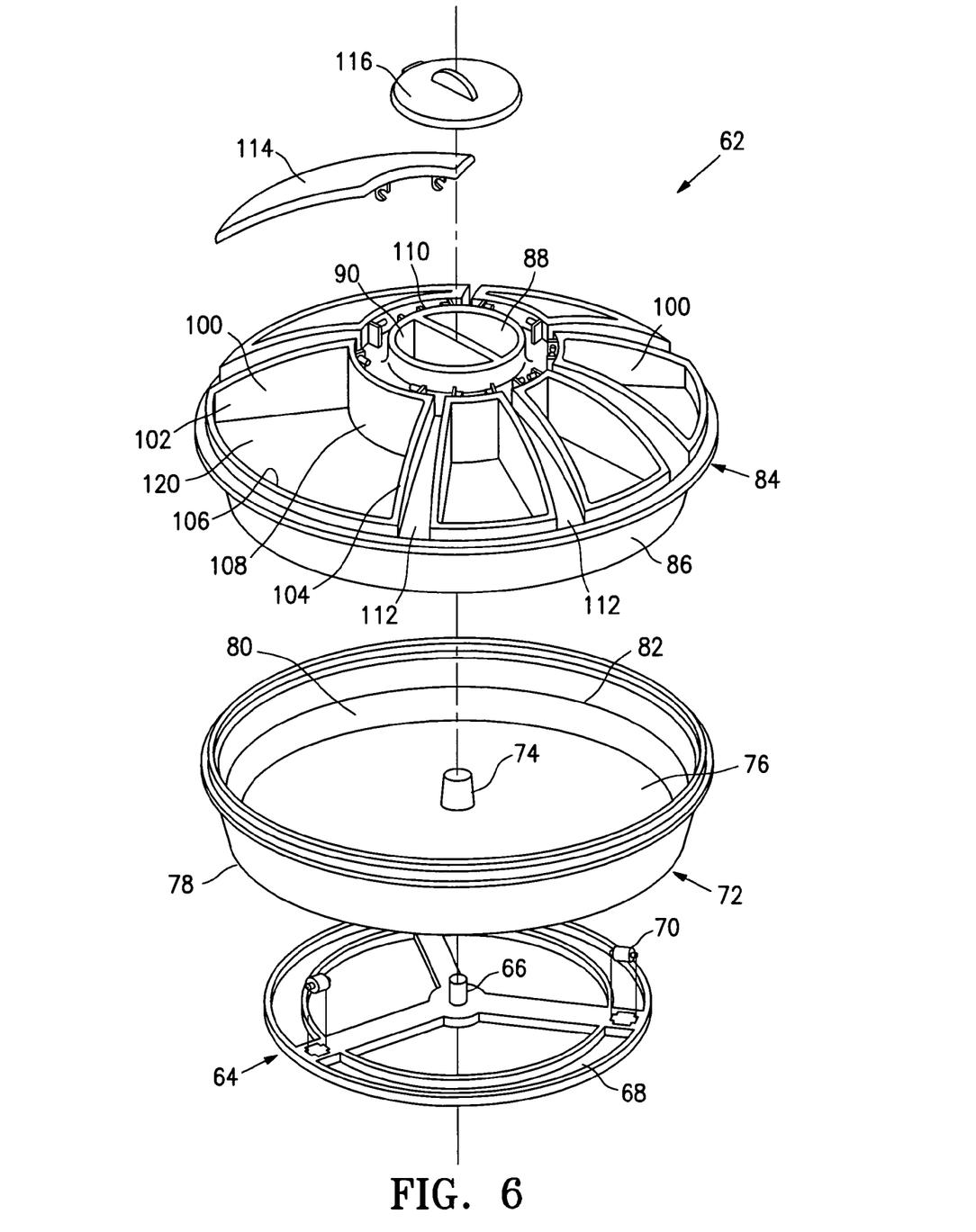
FIG. 6 is an exploded perspective view showing a rotary server for food, according to an alternative embodiment of the invention.
Figure 7:
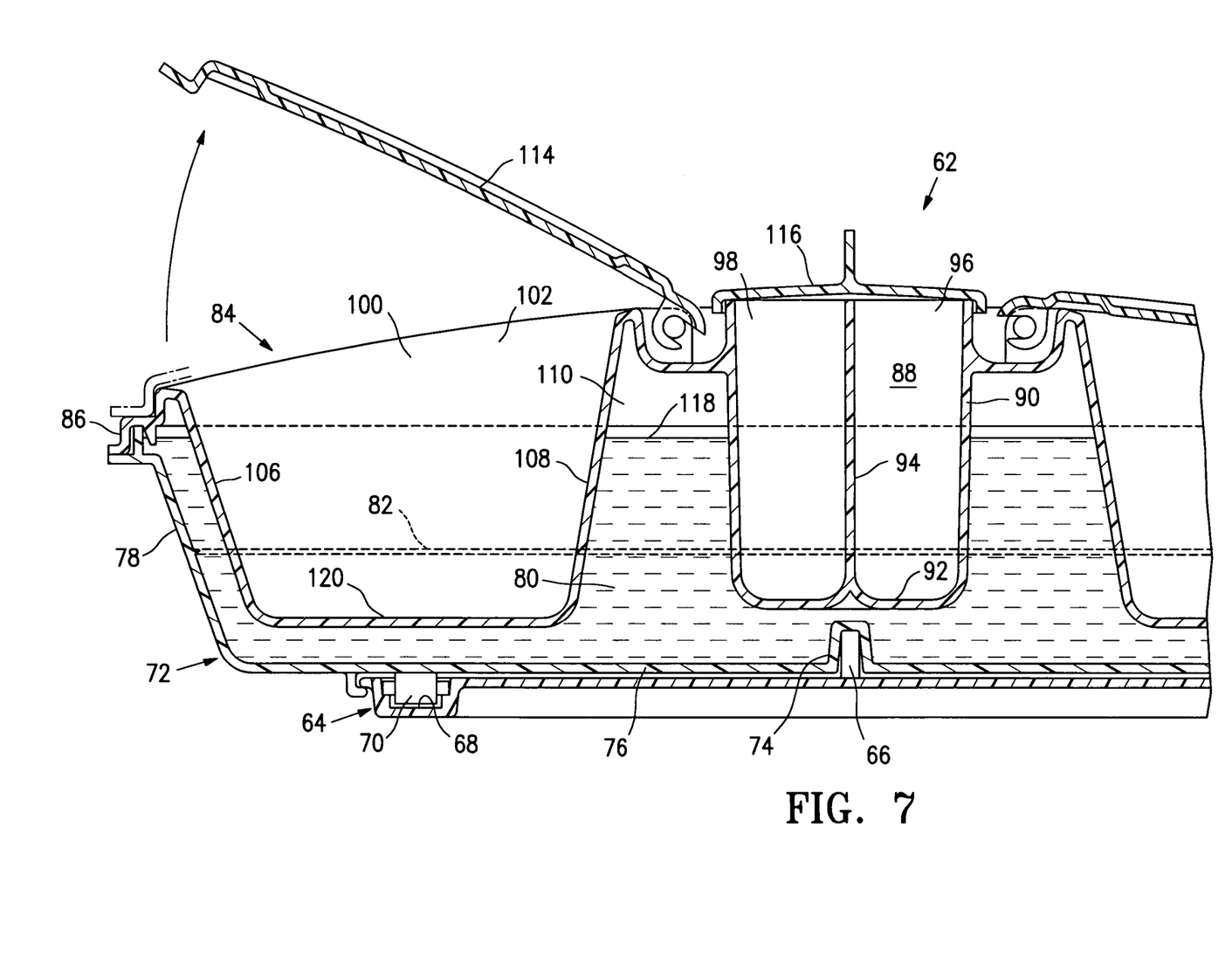
FIG. 7 is a side view in cross-section of a portion of the server shown in FIG. 6.

An alternative arrangement of a rotary food server 62 is shown and described hereafter in connection with FIGS. 6 and 7. FIG. 6 is an exploded perspective view showing the food server 62, and FIG. 7 is a side view in cross-section of a portion of the food server 62.

The rotary food server 62 includes a horizontal, stationary base 64 having an upwardly extending spindle 66 at a central portion thereof. An outer peripheral portion of the base 64 has a U-shaped channel 68. Rollers 70 are mounted at spaced locations about the U-shaped channel 68.

A lower housing 72 of circular configuration is rotatably mounted on the stationary base 64 by a receptacle 74 at the center of a bottom wall 76 thereof. The receptacle 74 receives the spindle 66 of the stationary base 64 therein so that the lower housing 72 may rotate about a vertical axis relative to the base 64. An outer portion of the bottom wall 76 engages the rollers 70 of the base 64 to facilitate such rotational movement of the lower housing 72.

The lower housing 72 has an outer peripheral rim 78 of circular configuration extending upwardly from an outer periphery of the bottom wall 76. The peripheral rim 78 forms a cavity 80 within the lower housing 72. A fill line 82 located part way up the height of the peripheral rim 78 extends circumstantially around the inside of the peripheral rim 78. The lower housing 72 is preferably of one-piece construction, such as by being molded of plastic material.

The food server 62 includes an upper housing 84 of generally circular configuration and having a peripheral rim 86 extending downwardly from the outer edge thereof. The upper housing 84 may be mounted on the lower housing 72, with the peripheral rim 86 of the upper housing 84 engaging the peripheral rim 78 of the lower housing 72 to provide a snap fit, as shown in FIG. 7.

The upper housing 84 has a generally cup-shaped central cavity 88 therein. The central cavity 88 has a generally cylindrical sidewall 90 extending upwardly from a bottom wall 92 thereof. A partition 94 divides the central cavity 88 into separate compartments 96 and 98. The upper housing 84 also includes a plurality of peripheral cavities 100 extending radially outwardly from the central cavity 88 to regions adjacent to the peripheral rim 86 of the upper housing 84. Each of the peripheral cavities 100 has a pair of sidewalls 102 and 104 at the opposite sides thereof, a sidewall 106 at the front thereof and a sidewall 108 at the back thereof. A circular central pocket 110 extends between the cylindrical sidewall 90 of the central cavity 88 and the sidewalls 108 at the backs of the peripheral cavities 100. The upper housing 84 also includes a plurality of peripheral pockets 112, each of which extends radially outwardly from the circular central pocket 110 between a different adjacent pair of the peripheral cavities 100. Each peripheral pocket 112 has opposite sides defined by the sidewalls 102 and 104 of an adjacent pair of the peripheral cavities 100.

Each of the peripheral cavities 100 is generally pie-shaped and forms a tray for food. A plurality of hinged lids 114 are removably mounted on the upper housing 84 so as to cover the cavities 100. Only one such lid 114 is shown in FIGS. 6 and 7 for simplicity of illustration. The central cavity 88 is covered by a hinged lid 116 which is removably mounted on the upper housing 84. Like the lower housing 72, the upper housing 84 is preferably of one-piece construction, and may be molded of plastic material. The removable lids 114 and 116 are added separately.

In order to chill the cavities 88 and 100 and the food stored within such cavities, a cooling medium is poured into the cavity 80 of the lower housing 72 up to the fill line 82. The cooling medium may comprise any fluid-like substance capable of imparting a cooling effect, but preferably comprises a mixture of water and ice. Chilled water can also be used, although the presence of ice tends to keep the water cool longer as its melt. With the cavity 80 filled to the fill line 82 by the water and ice mixture, the upper housing 84 is then mounted on the lower housing 72 where the peripheral rim 86 snap fits over the peripheral rim 78. As the upper housing 84 is mounted over the lower housing 72, the central cavity 88 and the peripheral cavities 100 which extend downwardly from the peripheral rim 78 of the lower housing 72 extend into and displace the water and ice mixture within the cavity 80 in the lower housing 72. The water level rises from the fill line 82 to a displaced level 118 shown in FIG. 7. With the water and ice mixture at the displaced level 118, the bottom wall 92 and substantial portions of the cylindrical sidewall 90 of the central cavity 88 are exposed to the water and ice mixture, as shown in FIG. 7. This imparts a substantial cooling effect to the central cavity 88 and to the compartments 96 and 98 therein. At the same time, the water and ice contact a bottom wall 120 of each of the peripheral cavities 100 as well as substantial portions of the sidewalls 102, 104, 106 and 108 thereof, as shown in FIG. 7. This also imparts a substantial cooling effect to the peripheral cavities 100.

Because of the one-piece molded construction of the upper housing 84, the undersides of the central cavity 88 and the peripheral cavities 100 are exposed to the water and ice mixture when the upper housing 84 is mounted on the lower housing 72. In addition to exposing the bottom walls 120 of the peripheral cavities 100 and the bottom wall 92 of the central cavity 88 to the water and ice mixture, the mixture is dispersed upwardly into the circular central pocket 110 surrounding the central cavity 88 and the peripheral pockets 112 separating the adjacent peripheral cavities 100. This enables substantial portions of the sidewall 90 of the central cavity 88 and the sidewalls 102, 104, 106 and 108 of the peripheral cavities 100 to be exposed to the water and ice mixture and chilled thereby. In this fashion, substantial cooling is imparted to the central cavity 88 and the peripheral cavities 100 by the water and ice mixture. Because the cavity 80 in the lower housing 72 is enclosed by the upper housing 84, the ice tends to melt slowly, and the water remains cold for a substantial period of time. However, should it become necessary to replace the water and ice mixture, it is a simple matter to remove the upper housing 84 from the lower housing 72 because of the snap fit therebetween. The water and melted ice within the cavity 80 of the lower housing 72 is then discarded and replaced with a fresh mixture, before again mounting the upper housing 84 onto the lower housing 72.

Although the invention has been described with respect to preferred embodiments, it will be understood by those skilled in the art that insubstantial variations in the embodiments disclosed may be made by one of ordinary skill in the art without departing from the invention set forth in the claims thereof.

I claim:

1. A rotary food server for storing food in a chilled condition and serving it to a user, comprising, a horizontal, stationary base;

a dish mounted for rotation on said stationary base about a vertical, central axis, said dish having a bottom wall, a peripheral rim, a central boss having an outer peripheral wall spaced radially from and facing toward said rim and a plurality of dividing walls extending radially between said boss and said rim to define a plurality of peripherally spaced pockets;

a plurality of trays shaped and sized to fit snugly and removably within said pockets, each said tray having a bottom wall facing towards said bottom wall of said dish, side walls extending radially in contact with the adjacent dividing walls defining the pocket within which the tray is received, inner and outer end walls extending peripherally in contact with adjacent regions of said boss and said rim, said walls of the tray defining an upwardly open tray interior within which food may be placed for storage, and a lid movably connected to the tray for opening and closing over the tray interior; and at least one coolant housing associated with each said tray, said coolant housing containing a chill retaining substance, said coolant housing positioned adjacent at least one wall of said tray for thermal transfer between said chill retaining substance and food placed within said tray, said tray and the associated said coolant housing being removable from said dish to enable said chill retaining substance to be refrigerated;

whereby, after refrigeration of said coolant housing and said substance therein, and subsequent placement of food within the associated tray and placement of said tray on said dish, the food within is stored in a chilled condition and may be served by rotating said dish to move the tray into proximity to the user and opening the lid.

2. The rotary food server as defined in claim 1, wherein said coolant housing comprises a hollow closed container removably positioned between the associated said tray and said bottom wall of said dish, within the associated said pocket, for thermal transfer through the bottom of said tray.

3. The rotary food housing as defined in claim 2, wherein said coolant housing further includes additional hollow closed containers removably connected with said dividing walls extending upwardly therefrom in contact with said sidewalls of the associated said tray for thermal transfer through the sides of said tray.

4. The rotary food server as defined in claim 1, wherein at least a portion of said walls of each said tray has hollow enclosed regions constituting said coolant housing.

5. The rotary food server as defined in claim 4, wherein said hollow enclosed regions containing said chill retaining substance are in each of said side and end walls of each said tray.

6. The rotary food server as defined in claim 1, wherein said lids are detachably, as well as movably, mounted to said trays, said trays being relatively sized and shaped to be stacked together in nested relation after removal of said lids.

7. The rotary food server as defined in claim 1, wherein said trays have different peripheral widths to have different interior capacities and said dividing walls of said dish are positioned to define said plurality of pockets to be of complemental shapes to said differently sized trays.

8. The rotary food server as defined in claim 1, wherein each said dividing wall of said dish extends peripherally for a sufficient peripheral distance to ensure that when adjacent said lids of adjacent said trays in place in said dish on either side of the dividing wall are raised concurrently from the closed to the open position they do so without interference between the lids.

9. The rotary food server as defined in claim 1, wherein at least one of said lids of said trays is transparent to permit food placed within to be visible when said lid is closed.

10. The rotary food server as defined in claim 1, wherein at least one of said lids of said trays is provided with a further hollow interior region containing the chill retaining substance.

11. The rotary food server as defined in claim 1, further including,
an interior wall of said boss defining, within said boss, a hollow upwardly open well closed at its lower end;
a cup for food shaped and sized to fit snugly within said well, removable and replaceable therein by vertical sliding motion; and
a lid for covering said cup.

12. The rotary food server as defined in claim 8, further including,
a sleeve within said well peripherally surrounding said cup, said sleeve also containing the chill retaining substance, said sleeve being refrigerated before placement of food in said cup to enable the food to be stored in said cup in a chilled condition.

13. The rotary food server defined in claim 1, further including,
a pocket insert positioned in each pocket, sized and shaped to conform thereto, between said bottom wall of said dish and the bottom wall of the one of said trays received in the pocket.

14. The rotary server as defined in claim 1, wherein,
said boss is provided with hollow regions of its outer peripheral wall, adjacent to the inner end walls of said trays, also containing said chill retaining substance.

15. The rotary server as defined in claim 1, wherein each dividing wall comprises,
a pair of radially extending, spaced, bottom dividing walls molded into said dish extending upwardly from its bottom wall, said bottom walls defining a slot between them; and
a main dividing wall fitted within said slot extending upwardly therefrom, said main dividing wall having hollow interior regions containing said chill retaining substance.

16. The rotary server as defined in claim 1, wherein each lid is connected to its associated one of said trays by structure comprising at least one hinge having,
an axle mounted to one of said inner end wall of said tray and said lid; and
a split socket, rotatably encircling said axle, mounted on the other of said inner wall and said lid, said split socket enabling snap fit connection to said axle for detachment and reattachment of said lid and said tray.

17. A rotary food server for storing food in a chilled condition and serving it to a user, comprising:
a horizontal, stationary base;
a lower housing mounted for rotation on said stationary base about a vertical, central axis, said lower housing having a bottom wall and a peripheral rim extending upwardly from the bottom wall and forming a cavity in the lower housing; and
an upper housing having a plurality of cavities therein within which food may be placed for storage and capable of being mounted over the lower housing and partially within the cavity therein;
whereby a cooling medium placed within the cavity of the lower housing contacts portions of the upper housing defining the cavities therein so as to chill food stored within the cavities when the upper housing is mounted over the lower housing; and
wherein the cavities in the upper housing have bottoms and sides exposed at the underside of the upper housing, whereby a cooling medium placed within the cavity of the lower housing is displaced upon mounting of the upper housing over the lower housing so as to contact the bottom and at least portions of the sides of the cavities in the upper housing.

18. A rotary food server for storing food in a chilled condition and serving it to a user, comprising:
a horizontal, stationary base;
a lower housing mounted for rotation on said stationary base about a vertical, central axis, said lower housing having a bottom wall and a peripheral rim extending upwardly from the bottom wall and forming a cavity in the lower housing; and
an upper housing having a plurality of cavities therein within which food may be placed for storage and capable of being mounted over the lower housing and partially within the cavity therein;
whereby a cooling medium placed within the cavity of the lower housing contacts portions of the upper housing defining the cavities therein so as to chill food stored within the cavities when the upper housing is mounted over the lower housing; and
wherein the cooling medium comprises a mixture of water and ice.

19. A rotary food server for storing food in a chilled condition and serving it to a user, comprising:
a horizontal, stationary base;
a lower housing mounted for rotation on said stationary base about a vertical, central axis, said lower housing having a bottom wall and a peripheral rim extending upwardly from the bottom wall and forming a cavity in the lower housing; and
an upper housing having a plurality of cavities therein within which food may be placed for storage and capable of being mounted over the lower housing and partially within the cavity therein;
whereby a cooling medium placed within the cavity of the lower housing contacts portions of the upper housing defining the cavities therein so as to chill food stored within the cavities when the upper housing is mounted over the lower housing; and
further including a plurality of hinged lids removably mounted on the upper housing to cover the cavities therein when closed.

20. A rotary food server for storing food in a chilled condition and serving it to a user, comprising:
a horizontal, stationary base;
a lower housing mounted for rotation on said stationary base about a vertical, central axis, said lower housing having a bottom wall and a peripheral rim extending upwardly from the bottom wall and forming a cavity in the lower housing; and
an upper housing having a plurality of cavities therein within which food may be placed for storage and capable of being mounted over the lower housing and partially within the cavity therein;
whereby a cooling medium placed within the cavity of the lower housing contacts portions of the upper housing defining the cavities therein so as to chill food stored within the cavities when the upper housing is mounted over the lower housing; and
wherein the upper housing is of circular configuration, and the cavities therein include a central cavity at the center of the upper housing and a plurality of peripheral cavities extending outwardly from the central cavity in radial fashion.

21. A rotary food server as defined in claim 20, wherein the upper housing includes a circular central pocket therein surrounding the central cavity and a plurality of peripheral pockets therein extending radially outwardly from the central pocket between adjacent pairs of the peripheral cavities, whereby a cooling medium placed within the cavity of the lower housing is displaced by the central pocket and the peripheral pockets upon mounting of the upper housing over the lower housing.

22. A rotary food server for storing food in a chilled condition and serving it to a user, comprising:
a horizontal, stationary base;
a lower housing mounted for rotation on said stationary base about a vertical, central axis, said lower housing having a bottom wall and a peripheral rim extending upwardly from the bottom wall and forming a cavity in the lower housing; and
an upper housing having a plurality of cavities therein within which food may be placed for storage and capable of being mounted over the lower housing and partially within the cavity therein;
whereby a cooling medium placed within the cavity of the lower housing contacts portions of the upper housing defining the cavities therein so as to chill food stored within the cavities when the upper housing is mounted over the lower housing; and
wherein the lower housing and the peripheral rim thereof are of circular configuration, and the upper housing is of circular configuration and has a downwardly extending peripheral rim of circular configuration which forms a snap fit with peripheral rim of the lower housing when the upper housing is mounted over the lower housing.

\* \* \* \* \*